Figure 1:
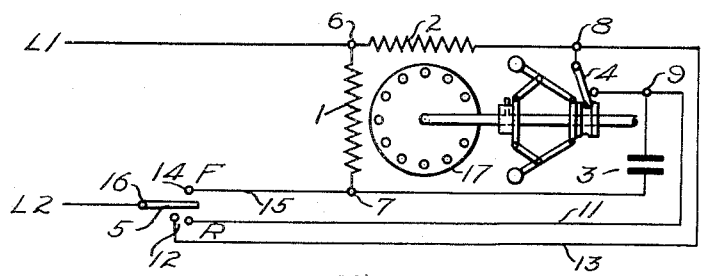

June 1, 1943.    H. E. ELLIS ET AL    2,320,419

REVERSING CAPACITOR-MOTOR

Filed July 14, 1942

WITNESSES:

INVENTORS
Harold E. Ellis and
Wendell C. Spear.
BY
ATTORNEY

Patented June 1, 1943

2,320,419

UNITED STATES PATENT OFFICE 2,320,419

REVERSING CAPACITOR MOTOR

Harold E. Ellis, Lima, and Wendell C. Spear, Wapakoneta, Ohio, assignors to Westinghouse Electric & Manufacturing Company, East Pittsburgh, Pa., a corporation of Pennsylvania Application July 14, 1942, Serial No. 450,885

3 Claims. (Cl. 172—279)

Our invention relates to a special type of reversing capacitor-motor, in the larger-size range of the so-called small-motor class, in which the highest efficiency, a high starting-torque, and a high continuous-duty rating are required in the forward direction of rotation, with only a short-time or intermittent rating in the reverse-direction, in which it is required that the motor shall still have a high starting-torque, but a relatively poor efficiency may be tolerated, because the reverse direction of rotation is used only for plugging the motor, for quick stoppage, the motor being stopped immediately, after reversing. There is a sufficient demand for this type of motor to make its size normal-duty efficiency, starting-torques, and cost important considerations in the design of the motor and its control.

Heretofore, the problem has been met by the special motor-design shown in Patent No. 2,242,343, issued to L. W. Buchanan on May 20, 1941, and assigned to the Westinghouse Electric & Manufacturing Company. This motor had an ordinary main winding, a special auxiliary winding having two sections connected in series, a capacitor permanently connected across two terminals of the main and auxiliary windings, the other terminals of the windings being connected together, and a single-pole reversing-switch for causing the motor to operate, in the forward direction, with single-phase power applied to the main winding, and to reverse with single-phase power applied to only one section of the auxiliary winding. Because a high rotor-resistance and a high capacitance both contribute to a high starting-torque, and because a high capacitance causes high losses in the auxiliary phase after the motor is up to speed, this Buchanan motor required a high-resistance rotor, high auxiliary-phase losses during running, a continuous-duty capacitor, and a two-section auxiliary winding, all of which meant a relatively poor efficiency and a relatively high cost.

It is an object of our present invention to produce a plug-reversed capacitor-motor having an increased power-rating and a better efficiency in the forward direction of rotation, and if possible to also reduce the cost of the motor. We accomplish this object by utilizing a starting-switch and an electrolytic (or other intermittent-rating) capacitor, in place of the continuously connected capacitor of the former motor; and we add means, to the plug-reversing control-mechanism, whereby the starting-switch is short-circuited during plugging.

Figure 2:
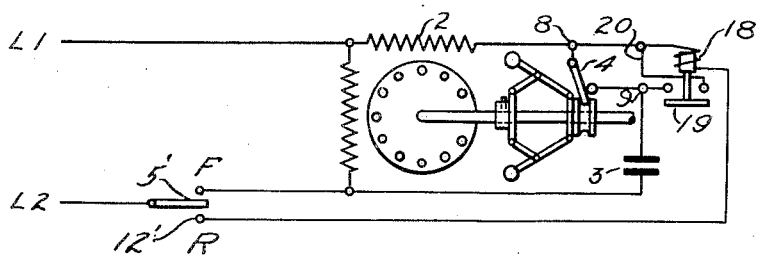

In the drawing, Fig. 1 is a diagrammatic view of circuits and apparatus illustrating our invention in a preferred form of embodiment, and Fig. 2 is a similar view showing an alternative construction.

As illustrated, our invention is a capacitor-start induction-run motor having a main winding 1, a spatially dephased auxiliary winding 2, an intermittent-duty capacitor 3, which is preferably of the electrolytic type, a centrifugal starting-switch 4 or other starting-switch of a type which automatically opens when the motor is well started, two supply-leads L1 and L2, and a reversing-switch 5.

The supply-lead L1 is permanently connected to a common terminal 6 of the main and auxiliary windings 1 and 2. The other terminals 7 and 8 of the main and auxiliary windings are joined by the capacitor 3 and the starting-switch 4 in series-circuit relation to each other. In the particular embodiment of our invention shown in Fig. 1, the starting-switch 4 is on the auxiliary-winding end of the connection just mentioned, with one terminal of the starting-switch 4 connected to the second terminal 8 of the auxiliary winding, and one terminal of the capacitor 3 connected to the second terminal 7 of the main winding, so that the common terminal 9 of the starting-switch 4 and capacitor 3 may be conveniently connected, through a circuit-connection 11, to one of two reverse-position contacts 12 on the reversing-switch 5, the other reverse-position contact 12 being connected, through a circuit-connection 13, to the second terminal 8 of the auxiliary winding 2, so that the two contacts 12 short-circuit or by-pass the starting-switch 4 in the reverse position R of the reversing-switch 5. In its forward position F, the reversing-switch 5 makes a single contact 14 which is joined, through a circuit-connection 15, to the second terminal 7 of the main winding 1. The second supply-lead L2 is connected to the movable element of the reversing-switch 5, as indicated at 16.

In operation, our motor, illustrated in Fig. 1, is always started in the forward direction, by throwing the reversing-switch 5 to the forward position F. This connects the main winding 1 as the main phase, using the auxiliary winding 2 as the starting phase in series with the starting-switch 4 and the capacitor 3. The motor starts up and runs as a conventional capacitor-start induction-run motor, the auxiliary winding 2 being cut out of service, by the starting switch 4, when the motor is partway up to speed. To reverse the motor, the reversing-switch 5 is thrown to its reverse position R, short-circuiting the starting-switch 4, and energizing the auxiliary winding 2 as the main phase, while the main winding 1 acts as the starting winding or auxiliary phase in series with the capacitor 3. The motor-plug reverses because the time-phase relationship of the two windings reverses, depending upon which winding is in series with the capacitor 3. The motor is applied to such an application that, in use, it is stopped immediately after reversal.

Several advantages are obtained from our motor as just described. Our intermittent-duty capacitor 3 is less expensive than a continuous-duty type. Since the capacitor 3 is disconnected, by the starting-switch 4, during normal running-conditions of the motor, the capacitor 3 may be made as large as may be required, in order to obtain any desired starting-torque, without introducing excessive auxiliary-phase losses during running, and the relative number of effective turns of the starting-winding 2 may likewise be chosen for best design-conditions in connection with the starting-torque requirements in the forward and reverse directions. Since an adequate starting-torque is obtainable through a choice of an adequate size of capacitor 3, our motor can be built with a low-resistance secondary-winding 17, resulting in a better efficiency during running conditions, and a lower cost of manufacture. Our single-section auxiliary winding 2 is also less expensive than the two-section winding previously required for this service, thus still further reducing the cost of our motor.

An alternative form of embodiment of our invention is shown in Fig. 2, in which we use a single-pole reversing-switch 5'. Where this feature is important, the problem is solved by the use of an auxiliary relay or current-responsive switch 18 which is responsive to the current flowing between the reverse-position switch contact 12' of the reversing-switch 5' and the second terminal 8 of the auxiliary winding 2. The auxiliary relay 18 has a make-contact 19 which is utilized to close a by-passing circuit 20 around the starting-switch 4. Except for this use of the relay 18 to short-circuit the starting-switch 4 during plug-reversal, the operation of our Fig. 2 motor is the same as our Fig. 1 motor.

We claim as our invention:

1. A reversible capacitor-start induction-run motor having a main winding, a spatially dephased auxiliary winding, a capacitor, a starting-switch, a reversing-switch, two supply-leads, the first supply-lead being connected to a common terminal of both the main winding and the auxiliary winding, the other terminals of the main and auxiliary windings being joined by the capacitor and the starting-switch in series-circuit relation to each other, the starting-switch being of a type which automatically opens when the motor is well started, connecting-means for utilizing the forward position of the reversing-switch to effect a connection between the second supply-lead and the second terminal of the main winding, and connecting-means for utilizing the reverse position of the reversing-switch to effect a connection between the second supply-lead and the second terminal of the auxiliary winding and to short-circuit the starting-switch.

2. A reversible capacitor-start induction-run motor having a main winding, a spatially dephased auxiliary winding, a capacitor, a starting-switch of a type which automatically opens when the motor is well started, two supply-leads, the first supply-lead being connected to a common terminal of both the main winding and the auxiliary winding, the other terminals of the main and auxiliary windings being joined by the capacitor and the starting-switch, with one terminal of the starting-switch connected to the second-mentioned terminal of the auxiliary winding, one terminal of the capacitor connected to the second-mentioned terminal of the main winding, and the common terminals of the starting-switch and the capacitor connected together, and a reversing-switch of a type which is operative, in its forward position, to close a switch-contact joining the second supply-lead to the second-mentioned terminal of the main winding, said reversing-switch being operative, in its reverse position, to close two switch-contacts effecting two connections, one joining the second supply-lead to the second-mentioned terminal of the auxiliary winding, and the other joining the second supply-lead to the common terminals of the starting-switch and the capacitor.

3. A reversible capacitor-start induction-run motor having a main winding, a spatially dephased auxiliary winding, a capacitor, a starting-switch of a type which automatically opens when the motor is well started, two supply-leads, the first supply-lead being connected to a common terminal of both the main winding and the auxiliary winding, the other terminals of the main and auxiliary windings being joined by the capacitor and the starting-switch in series-circuit relation to each other, a reversing-switch of a type which is operative, in its forward position, to close a switch-contact joining the second supply-lead to the second terminal of the main winding, said reversing-switch being operative, in its reverse position, to close a second switch-contact joining the second supply-lead to the second terminal of the auxiliary winding, and a current-responsive switch responsive to the current flowing between the second switch-contact and the auxiliary winding for closing a by-passing circuit around the starting-switch.

HAROLD E. ELLIS.
WENDELL C. SPEAR.